United States Patent
Inadama et al.

(10) Patent No.: US 8,436,312 B2
(45) Date of Patent: May 7, 2013

(54) DOI TYPE RADIATION DETECTOR

(75) Inventors: Naoko Inadama, Chiba (JP); Hideo Murayama, Chiba (JP); Kengo Shibuya, Chiba (JP); Fumihiko Nishikido, Chiba (JP); Taiga Yamaya, Chiba (JP); Eiji Yoshida, Chiba (JP)

(73) Assignee: National Institute of Radiological Sciences, Chiba (JP)

( * ) Notice: Subject to any disclaimer, the term of this patent is extended or adjusted under 35 U.S.C. 154(b) by 343 days.

(21) Appl. No.: 12/999,041

(22) PCT Filed: Oct. 8, 2008

(86) PCT No.: PCT/JP2008/068279
§ 371 (c)(1),
(2), (4) Date: Dec. 14, 2010

(87) PCT Pub. No.: WO2010/041313
PCT Pub. Date: Apr. 15, 2010

(65) Prior Publication Data
US 2011/0101229 A1  May 5, 2011

(51) Int. Cl.
*G01T 1/20* (2006.01)
(52) U.S. Cl.
USPC .................. 250/361 R; 250/332; 250/370.11
(58) Field of Classification Search ............ 250/370.01–370.15, 361 R
See application file for complete search history.

(56) References Cited

U.S. PATENT DOCUMENTS 6,749,761 B1 * 6/2004 Andreaco et al. ............... 216/24
6,806,997 B1 * 10/2004 Dueweke et al. ............. 359/302
7,193,208 B1   3/2007 Burr et al.
2004/0178347 A1 * 9/2004 Murayama et al. ........... 250/367

(Continued)

FOREIGN PATENT DOCUMENTS

JP      A-05-126957       5/1993
JP      A-06-337289      12/1994

(Continued)

OTHER PUBLICATIONS

Naoko Inadama, Hideo Murayama, Tomoaki Tsuda, Fumihiko Nishikido, Kengo Shibuya, Taiga Yamaya, Eiji Yoshida, Kei Takahashi, and Atsushi Ohmura, Title: Optimization of Crystal Arrangement on 8-Layer DOI PET Detector, Date: 2006, Publisher: IEEE Nuclear Science Symposium Conference Record, Pertinent pp. 3082-3085.*

(Continued)

*Primary Examiner* — David Porta
*Assistant Examiner* — Taeho Jo
(74) *Attorney, Agent, or Firm* — Oliff & Berridge, PLC

(57) ABSTRACT

This aims to provide a DOI type radiation detector in which scintillation crystals arranged two-dimensionally on a light receiving surface to form rectangular section groups in extending directions of the light receiving surface of a light receiving element are stacked up to make a three-dimensional arrangement and responses of the crystals that have detected radiation are made possible to identify at response positions on the light receiving surface, so that a three-dimensional radiation detection position can be obtained. In the DOI type radiation detector, scintillation crystals are right triangle poles extending upwards from the light receiving surface and the response positions on the light receiving surface are characterized. With this structure, DOI identification of a plurality of layers can be carried out by simply performing an Anger calculation of a light receiving element signal.

15 Claims, 17 Drawing Sheets

U.S. PATENT DOCUMENTS

| | | | |
|---|---|---|---|
| 2004/0262526 A1* | 12/2004 | Corbeil et al. | 250/367 |
| 2006/0243913 A1* | 11/2006 | Overdick et al. | 250/361 R |
| 2009/0032717 A1* | 2/2009 | Aykac et al. | 250/367 |
| 2009/0134334 A1* | 5/2009 | Nelson | 250/361 R |
| 2009/0159804 A1* | 6/2009 | Shibuya et al. | 250/363.03 |
| 2011/0121184 A1* | 5/2011 | Inadama et al. | 250/361 R |

FOREIGN PATENT DOCUMENTS

| | | |
|---|---|---|
| JP | A-08-005746 | 1/1996 |
| JP | A-11-142523 | 5/1999 |
| JP | A-2002-090458 | 3/2002 |
| JP | A-2003-021682 | 1/2003 |
| JP | A-2004-132930 | 4/2004 |
| JP | A-2004-279057 | 10/2004 |
| JP | A-2005-043062 | 2/2005 |
| JP | A-2007-093376 | 4/2007 |
| JP | A-2007-147598 | 6/2007 |
| JP | A-2007-525652 | 9/2007 |
| WO | WO 2008023451 A1 * | 2/2008 |

OTHER PUBLICATIONS

"Sankakuchugata Kessho o Mochiita PET-yo DOI Kenshutuki no Teian," *Japanese Journal of Nuclear Medicine*, 2008, vol. 45, No. 3, p. S215.

"Sankakuchugata Kessho o Mochiita PET-yo DOI Kenshutuki no Kiso Kenkyu," *Japanese Society of Applied Physics*, 2008, vol. 69, No. 1, p. 117.

Seidel et al., "Depth Identification Accuracy of a Three Layer Phoswich PET Detector Module," *IEEE Transactions on Nuclear Science*, 1999, vol. 46, No. 3, pp. 485-490.

Yamamoto et al., A GSO depth of interaction detector for PET, *IEEE Transactions on Nuclear Science*, 1998, vol. 45, No. 3, pp. 1078-1082.

Liu et al., "Development of a depth of interaction detector for γ-rays," *Nuclear Instruments and Methods in Physics Research* A, 2001, vol. 459, pp. 182-190.

Zhang et al., "Anode Position and Last Dynode Timing Circuits for Dual-Layer BGO Scintillator With PS-PMT Based Modular PET Detectors," *IEEE Transactions of Nuclear Science*, 2002, vol. 49, No. 5, pp. 2203-2207.

Tsuda et al., "A Four-Layer Depth of Interaction Detector Block for Small Animal PET," *IEEE Transactions on Nuclear Science*, 2004, vol. 51, No. 5, pp. 2537-2542.

Hasegawa et al., "Depth-of-Interaction Recognition Using Optical Filters for Nuclear Medicine Imaging," *IEEE Transactions on Nuclear Science*, 2005, vol. 52, No. 1, pp. 4-7.

Hong et al., "Concept Verification of Three-Layer DOI Detectors for Small Animal PET," *IEEE Transactions on Nuclear Science*, 2008, vol. 55, No. 3, pp. 912-917.

Inadama et al., "8-Layer DOI Encoding of 3-Dimensional Crystal Array," *IEEE Transactions on Nuclear Science*, 2006, vol. 53, No. 5, pp. 2523-2528.

Shirakawa, "Whole-Directional Gamma Ray Detector Using a Hybrid Scintillator," *Radioisotopes*, 2004, vol. 53, pp. 445-450 (w/ English-language Abstract).

International Search Report in International Application No. PCT/JP2008/068279; dated Jan. 27, 2009 (with English-language translation).

\* cited by examiner 2D position histogram
(crystal response)

DOI TYPE RADIATION DETECTOR

TECHNICAL FIELD

The present invention relates to a DOI type radiation detector, and more particularly to a DOI type radiation detector that is suitable for use in the field of nuclear medical imaging and radiation measurement such as a positron imaging device and a positron emission tomography (PET) device and can make DOI identification of two layers by only Anger calculations of the signals of a light receiving element.

BACKGROUND ART

Typical radiation detectors have a light receiving element optically coupled with a scintillation crystal (also referred to as a crystal element). To provide positron imaging devices and PET devices of higher spatial resolution, there has been developed a DOI (Depth of Interaction) radiation detector (hereinafter, also referred to simply as a DOI detector) which can even detect the position of incidence to the crystal element in the depth direction. As shown in FIG. 1, a light receiving element 10 such as a position sensitive photomultiplier tube (PS-PMT) is provided thereon and optically coupled with a crystal block 20 which includes a three-dimensional array of a large number of crystal elements extending upward above the light receiving surface. By identifying crystal element that detect radiation, the detection position in the crystal block 20 is obtained in a three-dimensional manner.

The DOI detector is useful in identifying the three-dimensional direction in which the radiation source is. The use of the DOI detector as a radiation detector for a PET device can improve the sensitivity of the PET device without degrading the resolution.

The crystal elements in the DOI detector can be identified by various techniques. For example, crystal elements that are two-dimensionally arranged in parallel on the light receiving surface of the light receiving element 10 are identified by Anger calculations of the outputs of the light receiving element. As illustrated in FIG. 2, the response positions of the respective crystal elements appear on a two-dimensional (2D) position histogram which shows the results of the Anger calculations. The Anger calculation is a method to calculate the center of gravity or the response position of light receiving element signals, and is widely known as a method for discriminating a large number of crystal elements with a small number of light receiving elements.

To make crystal identification in the depth direction, i.e., to identify a plurality (in FIG. 1, three) of stacked layers of two-dimensional arrays 21, 22, and 23 of crystal elements illustrated in FIG. 1, there have been proposed the following techniques:

(1) As shown in FIGS. 1(a) and 1(b), scintillation crystals having different waveforms are used for the respective layers (in FIG. 1(a), LSO, GSO, and BGO; in FIG. 1(b), GSO with 1.5 mol % of Ce, 0.5 mol % of Ce, and 0.2 mol % of Ce, respectively). The layers are identified by waveform discrimination (see Patent Document 1 and Non-Patent Documents 1 and 2).

(2) A two-dimensional array of scintillation crystals typically includes a reflector between the individual crystal elements, in which case the responses of the respective crystal elements appear on the 2D position histogram at the positions where the layout of the crystal elements is reflected. Using this, as shown in FIG. 3(a), the first layer 21 is formed, for example, as a 6×6 crystal array and the second layer 22 a 7×7 crystal array so that the layers overlap each other with a displacement therebetween. Alternatively, grooves are cut from above and below the crystal block 20 to form slits 30 in the crystal arrays 21 and 22 so that the upper and lower crystal elements are laid out differently as shown in FIG. 3(b). The response positions of the respective crystal elements in the three-dimensional array are thereby separated so as to be identifiable as illustrated in the 2D position histogram of FIG. 2 (see Non-Patent Documents 3 and 4).

(3) As illustrated in FIG. 4, the reflector 32 in the two-dimensional crystal arrays 21 to 24 may be removed in part so as to control the spreading of the scintillation light. This makes it possible to control the response positions of the respective crystal elements 30. In the diagram, 34 represents a portion where there is an extremely thin layer of air without the reflector 31. Consequently, as shown in FIG. 5, the response positions of all the crystals in the three-dimensional array can be separated for identification (see Patent Documents 2 to 5 and Non-Patent Document 5).

(4) Filters for cutting off certain wavelengths are interposed between layers, and the layers are identified by the resulting wavelengths (see Patent Document 6 and Non-Patent Document 6).

(5) In some approaches, the foregoing techniques (2) and (3) are combined with the waveform discrimination (1) for multistage identification (see Non-Patent Documents 7 and 8).

Such DOI detectors are all configured to include a rectangular prism crystal or to have each element with a rectangular prism shape.

Meanwhile, there have been proposed technologies for use in two-dimensional crystal array radiation detectors that do not perform DOI detection, wherein triangular prism scintillator crystals are used as in the present invention. In any of the technologies, the crystal shape has been contrived for the purpose of closely arranging the crystal elements. The technology described in Patent Document 7 is to shape the entire detector including its crystal element and light receiving element as a triangular prism so that a large number of detectors can be closely arranged in a spherical configuration.

The technology described in Non-Patent Document 9 is to arrange several different types of crystal elements on a light receiving element of cylindrical shape with the acute angles of the triangles toward the center. Detecting crystals are identified from the waveforms, whereby the direction of the radiation source is identified.

The technology described in Patent Document 8 is to arrange detectors of rectangular prism shape into a hexagonal PET detector ring, in which case triangular prism scintillation crystals and light receiving elements are used as auxiliary infilling detectors.

Patent Document 1: Japanese Patent Application Laid-Open No. Hei 6-337289
Patent Document 2: Japanese Patent Application Laid-Open No. Hei 11-142523
Patent Document 3: Japanese Patent Application Laid-Open No. 2004-132930
Patent Document 4: Japanese Patent Application Laid-Open No. 2004-279057
Patent Document 5: Japanese Patent Application Laid-Open No. 2007-93376
Patent Document 6: Japanese Patent Application Laid-Open No. 2005-43062
Patent Document 7: Japanese Patent Application Laid-Open No. Hei 8-5746
Patent Document 8: Japanese Patent Application Laid-Open No. Hei 5-126957

Non-Patent Document 1: J. Seidel, J. J. Vaquero, S. Siegel, W. R. Gandler, and M. V. Green, "Depth identification accuracy of a three layer phoswich PET detector module," IEEE Trans. on Nucl. Sci., vol. 46, No. 3, pp. 485-490, June 1999

Non-Patent Document 2: S. Yamamoto and H. Ishibashi, "AGSO depth of interaction detector for PET," IEEE Trans. on Nucl. Sci., vol. 45, No. 3, pp. 1078-1082, June 1998

Non-Patent Document 3: H. Liu, T. Omura, M. Watanabe, and T. Yamashita, "Development of a depth of interaction detector for y-rays," Nucl. Inst. Meth., A459, pp. 182-190, 2001.

Non-Patent Document 4: N. Zhang, C. J. Thompson, D. Togane, F. Cayouette, K. Q. Nguyen, M. L. Camborde, "Anode position and last dynode timing circuits for dual-layer BGO scintillator with PS-PMT based modular PET detectors," IEEE Trans. Nucl. Sci., vol. 49, No. 5, pp. 2203-2207, October 2002.

Non-Patent Document 5: T. Tsuda, H. Murayama, K. Kitamura, T. Yamaya, E. Yoshida, T. Omura, H. Kawai, N. Inadama, and N. Orita, "A four-layer depth of interaction detector block for small animal PET," IEEE Trans. Nucl. Sci., vol. 51, pp. 2537-2542, October 2004.

Non-Patent Document 6: T. Hasegawa, M. Ishikawa, K. Maruyama, N. Inadama, E. Yoshida, and H. Murayama, "Depth-of-interaction recognition using optical filters for nuclear medicine imaging," IEEE Trans. Nucl. Sci., vol. 52, pp. 4-7, February 2005.

Non-Patent Document 7: S. J. Hong, S. I. Kwon, M. Ito, G. S. Lee, K.-S. Sim, K. S. Park, J. T. Rhee, and J. S. Lee, "Concept verification of three-layer DOI detectors for small animal PET," IEEE Trans. Nucl., Sci., vol. 55, pp. 912-917, June 2008.

Non-Patent Document 8: N. Inadama, H. Murayama, M. Hamamoto, T. Tsuda, Y. Ono, T. Yamaya, E. Yoshida, K. Shibuya, and F. Nishikido, "8-layer DOI encoding of 3-dimensional crystal array," IEEE Trans. Nucl. Sci., vol. 53, pp. 2523-2528, October 2006.

Non-Patent Document 9: Y. Shirakawa, "Whole-Directional Gamma Ray Detector Using a Hybrid Scintillator," Radioisotopes, vol. 53, pp. 445-450, 2004.

The waveform discrimination-based method (1) is made possible by a combination of certain crystals. Problems have been pointed out, however, that it entails a discrimination error and that it lowers the time resolution and degrades the count rate characteristic of the detector. The method (2) of mutually displacing the layers needs fine adjustments of the displacement. In addition, the crystal arrays of different sizes in the upper and lower layers make it difficult to wrap the reflector around the entire crystal arrays. The method (3) using light distribution control creates wasted space on the 2D position histogram as shown in FIG. 6. The greater the distances between the crystal response positions are, the better the separation is and the more enhanced the resulting discrimination power is. The crystal response positions are therefore ideally aligned at uniform intervals on the 2D position histogram. In order to increase the distances between the crystal response positions, it is also important to reduce the spreading of each crystal response position on the 2D position histogram. For that purpose, it is needed to improve the efficiency with which the light receiving element detects scintillation light. With rectangular prism crystals, however, the efficiency is difficult to improve since the scintillation light can repeat regular reflections inside. The method (4) using a wavelength cut filter lowers the detection efficiency of the scintillation light.

DISCLOSURE OF THE INVENTION

The present invention has been achieved to solve the foregoing conventional problems. It is an object of the present invention to provide a DOI type radiation detector which allows DOI identification of a plurality of layers by only Anger calculations of the signals of the light receiving element and which facilitates the processing of measurement data.

The foregoing object of the present invention has been solved by the provision of a DOI type radiation detector having scintillation crystals that are two-dimensionally arranged on a light receiving surface of a light receiving element so as to form groups of rectangular (oblong rectangular or square) sections (see the sections surrounded by the reflectors in FIG. 4) in spreading directions of the light receiving surface, the scintillation crystals being stacked into a three-dimensional array so that a response of a radiation-detecting crystal is identifiable from a response position on the light receiving surface, whereby a radiation detection position is determined in three dimensions, the scintillation crystals being formed as right triangular prisms extending upward above the light receiving surface so as to characterize the response position on the light receiving surface.

Here, a combination of the scintillation crystals in predetermined two layers above a predetermined position of the light receiving surface may be such that a first layer includes right triangular prisms extending upward above the light receiving surface and a second layer includes rectangular prisms extending upward above the light receiving surface so that response positions of the two crystals on the light receiving surface are staggered in the spreading directions of the light receiving surface.

A combination of the scintillation crystals in predetermined two layers above a predetermined position of the light receiving surface may be such that first and second layers both include right triangular prisms extending upward above the light receiving surface with different orientations so that response positions of the two crystals on the light receiving surface are staggered in the spreading directions of the light receiving surface.

The scintillation crystals in predetermined two layers above the predetermined position of the light receiving surface may be made of respective different materials so that the response positions of the two crystals on the light receiving surface are staggered in the spreading directions of the light receiving surface.

Two of the right triangular prisms may be arranged to form a rectangular prism with their hypotenuses opposed to each other, thereby forming the rectangular section.

A combination of the scintillation crystals in predetermined two layers above a predetermined position of the light receiving surface may include: a rectangular prism block that is formed by arranging four right triangular prism scintillation crystals so that sides forming their respective vertices concentrate each other; and a rectangular prism block that is formed by arranging four rectangular prism scintillation crystals so that either ones of sides forming one of their corners concentrate each other and so that the two rectangular prism blocks have the same cross section perpendicular to their prism axis, the rectangular prism blocks each forming the rectangular section.

The crystals may have a size twice that of a diagonally-quartered crystal.

The crystals having the size twice that of the diagonally-quartered crystal may be used in a lowermost layer.

Eight of the right triangular prism scintillation crystals may be arranged to form a rectangular prism block so that either ones of sides forming their vertices concentrate each other. Side faces of the rectangular prism block may be surrounded by a reflector to form a side shielded rectangular prism block.

Such side shielded rectangular prism blocks in predetermined layers above a predetermined position of the light receiving surface may overlap each other with a displacement in one of extending directions of narrow sides of the right triangular prism scintillation crystals by the length of the narrow sides, whereby the response positions of the two crystals are staggered in the spreading directions of the light receiving surface.

With four layers, the extending direction may be changed from one layer to another.

Two of the right triangular prism scintillation crystals may be arranged to form a rectangular prism with their hypotenuses opposed to each other. Four such rectangular prisms may be arranged to form a rectangular prism block so that any ones of their sides forming an angle not including the hypotenuse concentrate each other. Side faces of the rectangular prism block may be surrounded by a reflector to form a side shielded rectangular prism block. Such side shielded rectangular prism blocks in predetermined layers above a predetermined position of the light receiving surface may overlap each other with a displacement in one of extending directions of narrow sides of the right triangular prism scintillation crystals by the length of the narrow sides, whereby the response positions of the two crystals are staggered in the spreading directions of the light receiving surface.

With four layers, the extending direction may be changed from one layer to another.

The foregoing DOI type radiation detectors may be combined so that the responses of the crystals up to eight layers above a predetermined position of the light emitting surface are staggered in the spreading directions of the light receiving surface.

The foregoing DOI type radiation detectors may be made of different materials and stacked to form a structure with more layers.

The right triangular prism may be an isosceles right triangular prism.

According to the present invention, DOI identification of a plurality of layers can be performed by only Anger calculations of the signals of the light receiving element. In addition, the formation of the groups of rectangular sections allows easy processing and provides favorable connection with adjoining blocks.

The present invention provides the same effects even if the cross sections of the crystals are somewhat different from a right triangular shape. The differences in shape shall cover not only angular differences from a right angle but also rounded triangle vertices. The allowable range of differences is such that the resulting crystal arrays will not impair the sensitivity of the PET detector or radiation detector, and such that crystal identification on the 2D position histogram will not be precluded.

PS-PMT often has a light receiving surface of rectangular shape. To enhance the radiation detection sensitivity of the detector, scintillation crystals need to be closely arranged on the light receiving surface. According to the present invention, the scintillation crystals form rectangular sections in the spreading directions of the light receiving surface of the light receiving element, which facilitates arranging the crystals on the light receiving element of rectangular shape at high density.

BEST MODE FOR CARRYING OUT THE INVENTION

Hereinafter, embodiments of the present invention will be described in detail with reference to the drawings.

Figure 1:
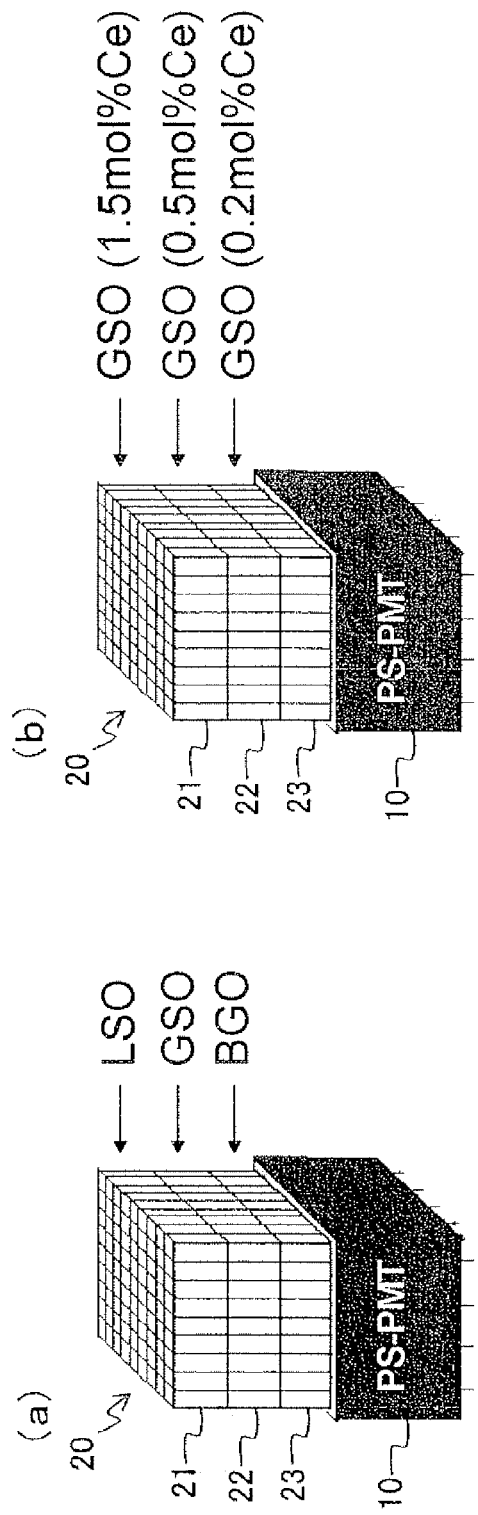
FIGS. 1(a) and 1(b) are perspective views showing examples of the configuration of a conventional DOI detector.
Figure 2:
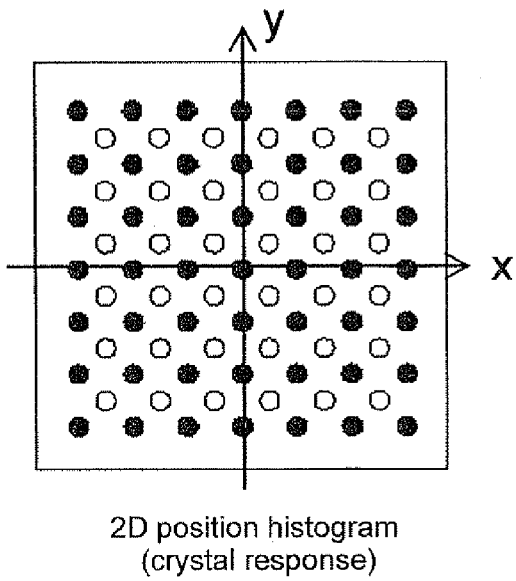
FIG. 2 is a diagram showing an example of crystal response positions of a conventional DOI detector on a 2D position histogram.
Figure 3:
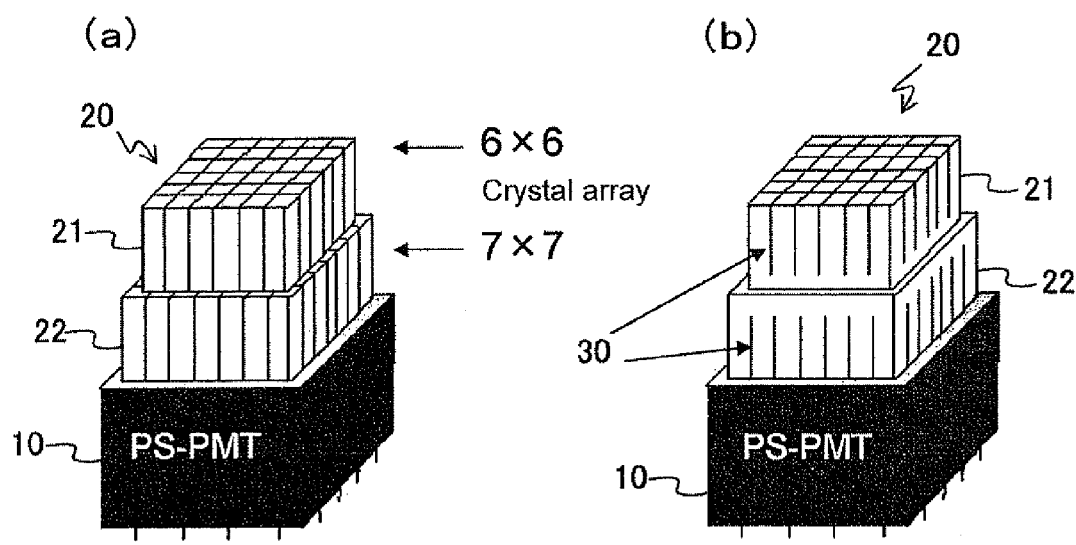
FIGS. 3(a) and 3(b) are perspective views showing other examples of the configuration of a conventional DOT detector.
Figure 4:
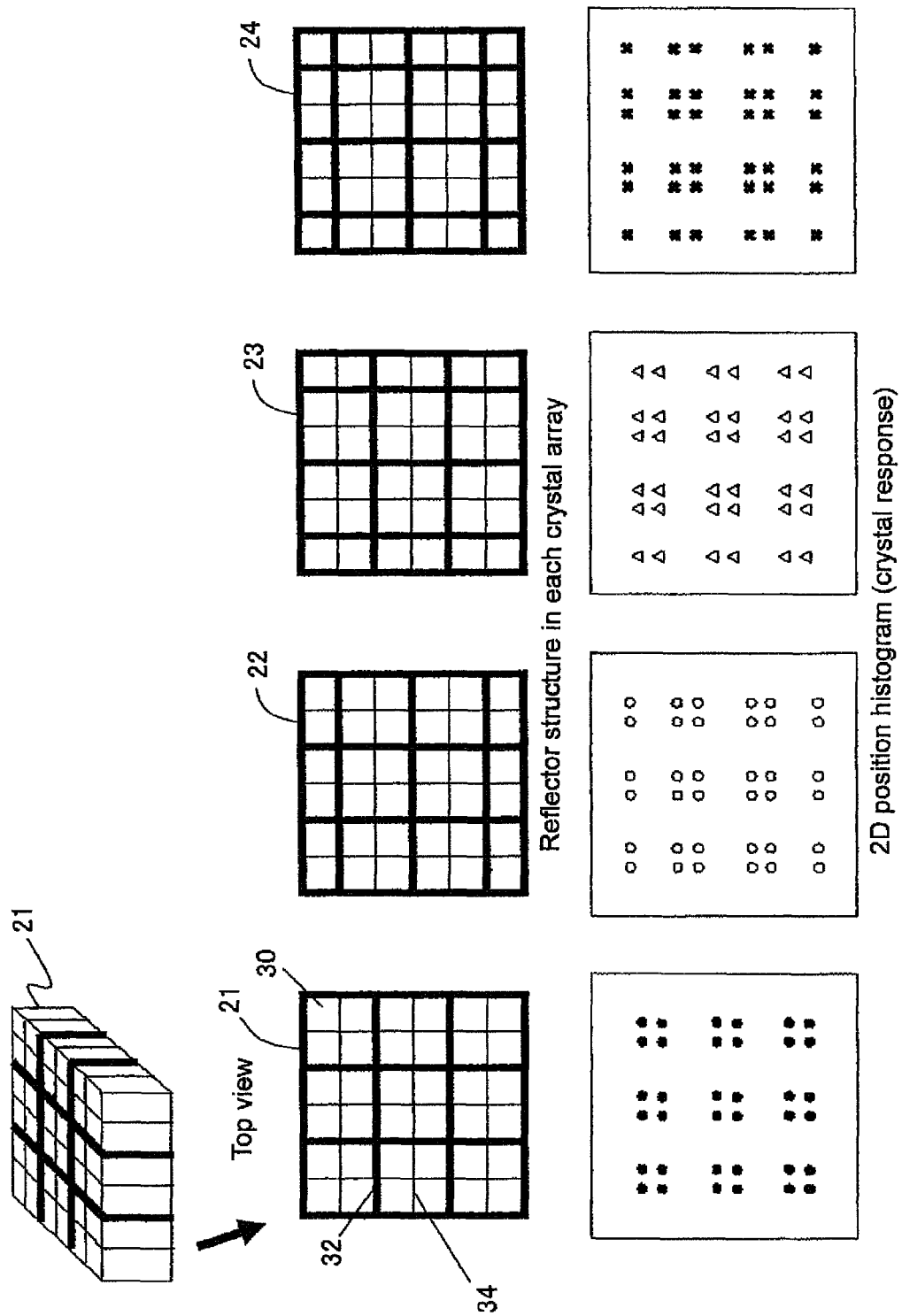
FIG. 4 is a diagram showing yet another example of a conventional DOT detector.
Figure 5:
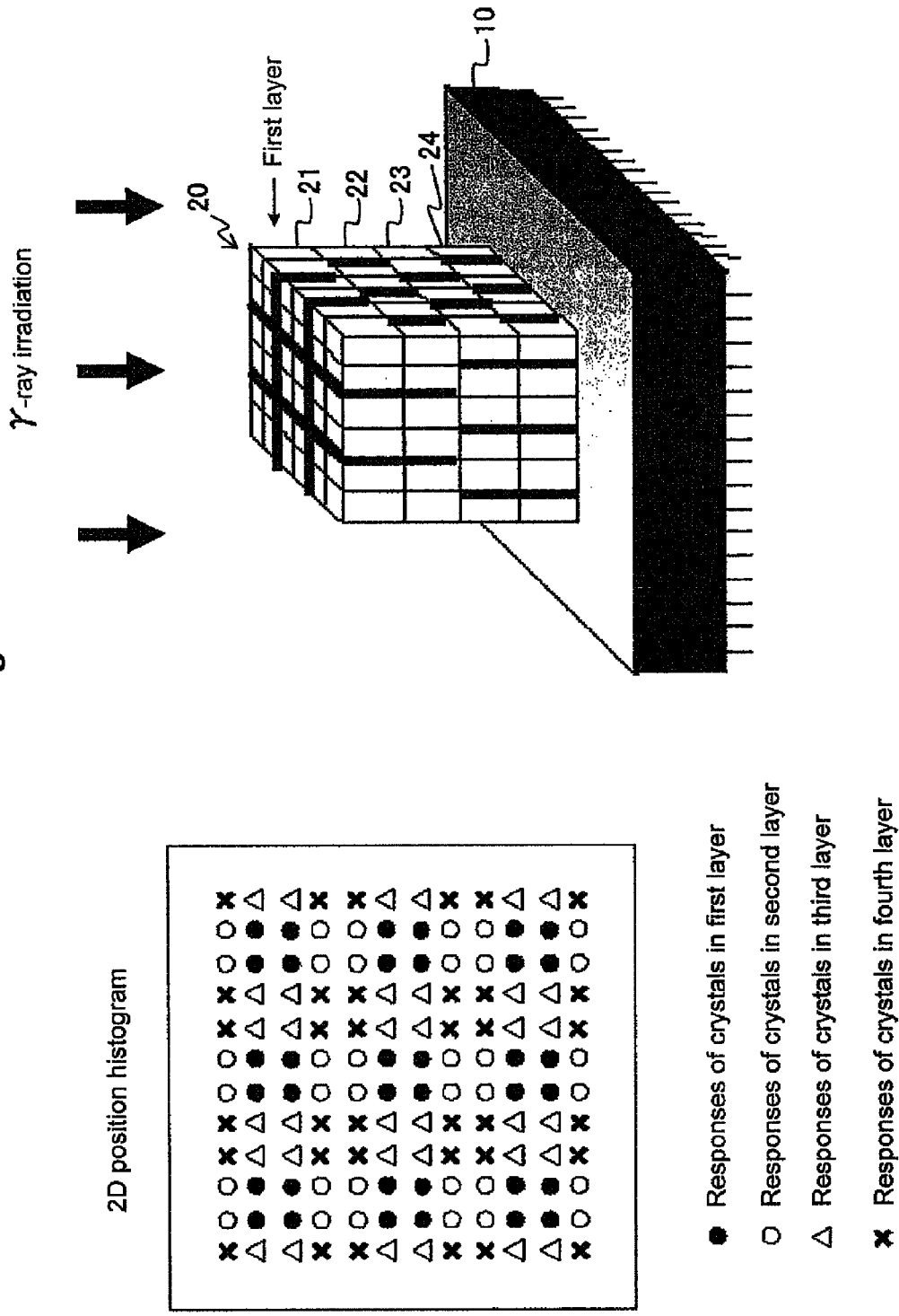
FIG. 5 is a diagram showing an example of a four-layer DOT detector that is configured according to the example of FIG. 4.
Figure 6:
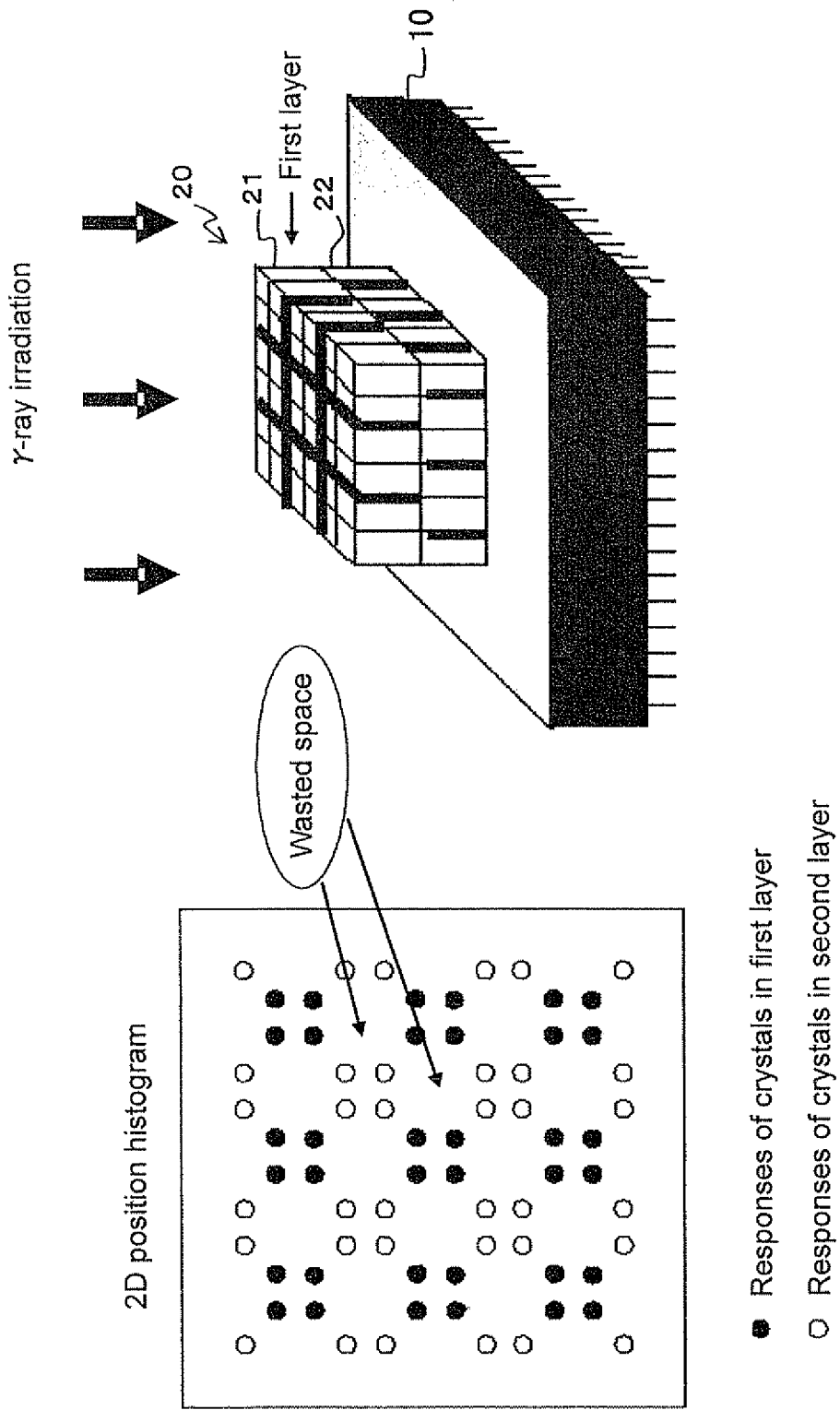
FIG. 6 is a diagram showing the problem when a two-layer DOT detector is formed by using conventional rectangular prism scintillation crystals.
Figure 7:
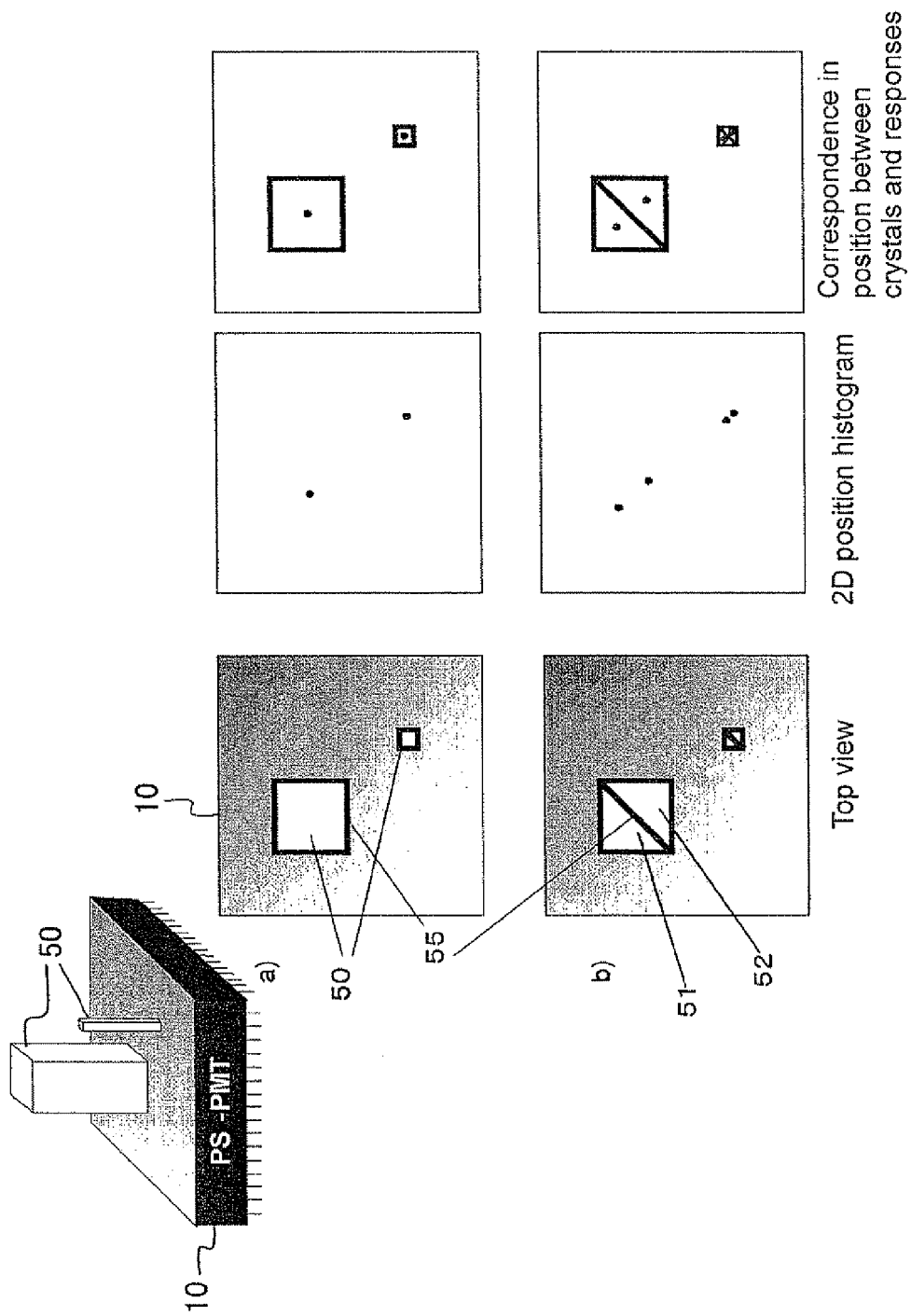
FIG. 7(a) is a diagram showing a top view, a 2D position histogram, and the correspondence between crystals and response positions of a comparative example
FIG. 7(b) is a diagram showing those of the present invention for explaining the principle of the present invention.

Suppose, as shown in FIG. 7(a), that all the side faces of rectangular prism crystal elements 50 are covered with a reflector 55. On the 2D position histogram that shows the results of Anger calculations on the outputs of the light receiving element 10, the crystal responses appear at positions corresponding to the centers of gravity of the crystal bottoms on the light receiving element surface. The same holds when the crystal bottoms have other polygonal shapes. As shown in FIG. 7(b), when the rectangular prisms are divided into two right triangular prisms 51 and 52, the response appears at positions corresponding to the centers of gravity of the respective triangles.

Figure 8:
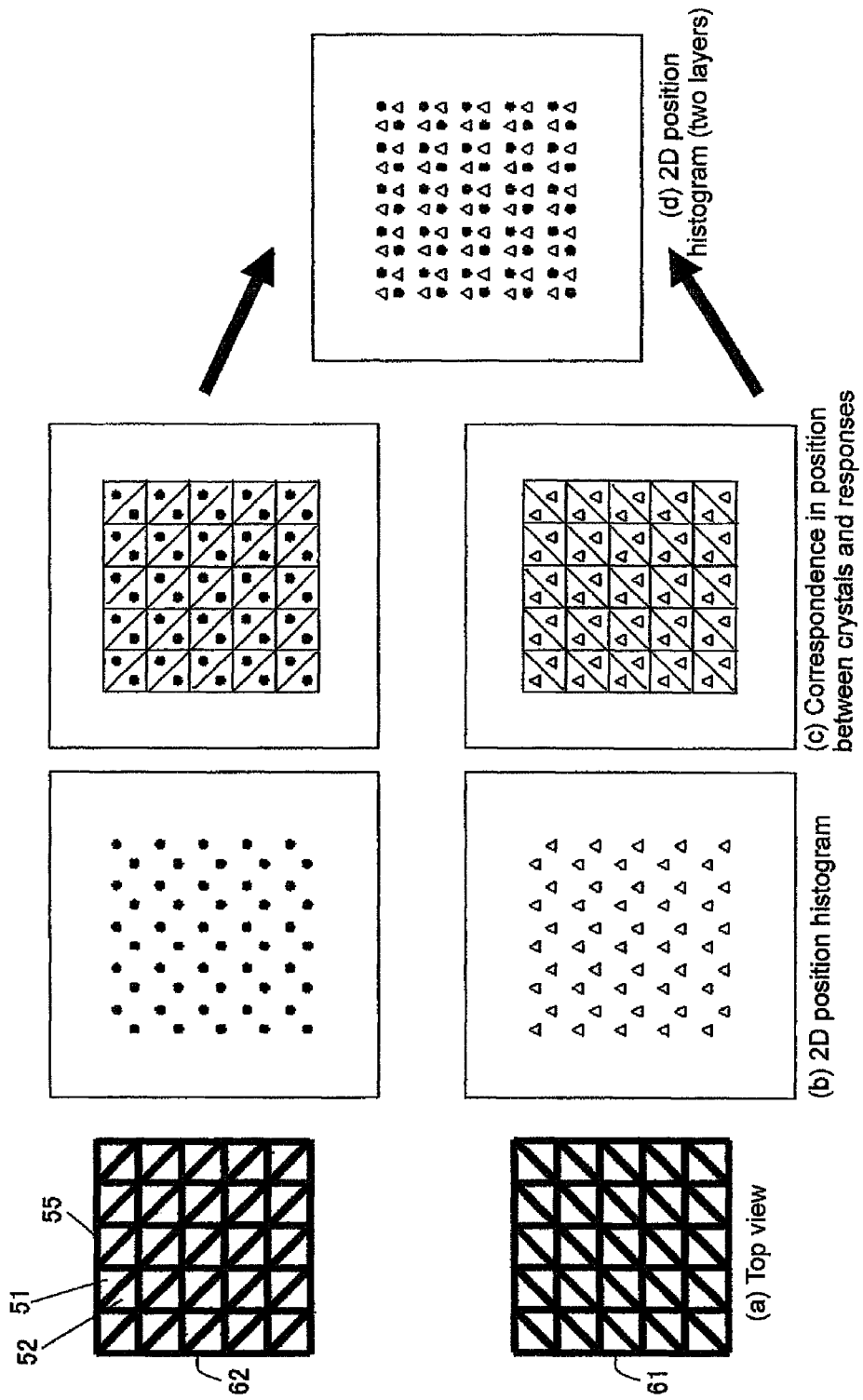
FIGS. 8(a), 8(b), 8(c) and 8(d) are similar diagrams showing a two-layer situation.

If crystal arrays intended for a two-layer DOI detector are composed of rectangular prism crystals, the response positions of the upper and lower crystals are not identifiable since the positions coincide with each other. As shown in FIG. 8, each crystal is then shaped as a right triangular prism, and two right triangular prisms are arranged to form a rectangular prism with their hypotenuses opposed to each other. The crystals of the upper layer 61 and those of the lower layer 62 can be divided in different directions, so that the response positions of the crystals of the upper layer 61 and those of the lower layer 62 differ from each other in the spreading directions of the light receiving surface. This makes crystal identification on a single 2D position histogram possible.

Figure 9:
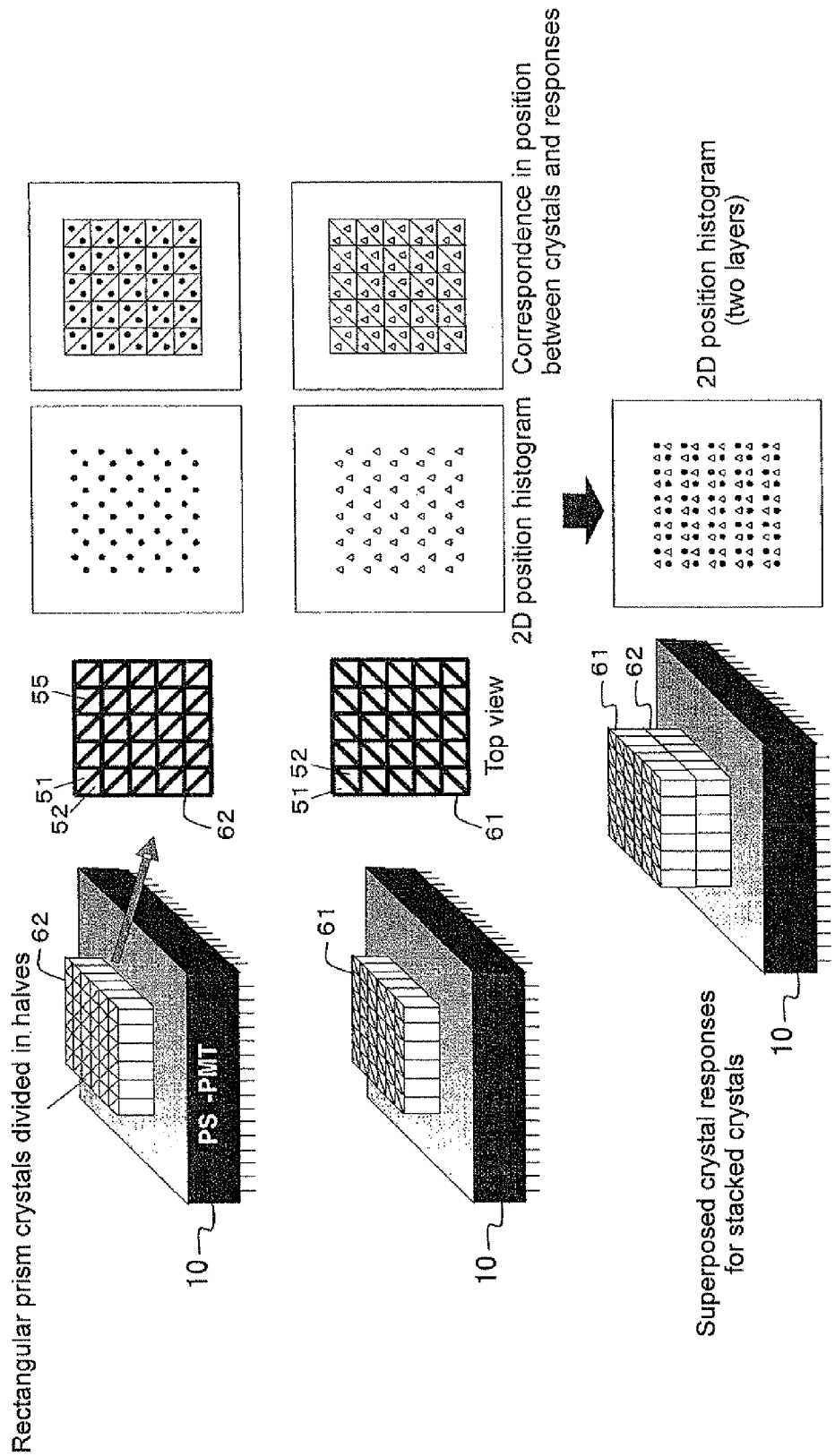
FIG. 9 is a diagram showing a two-layer DOT detector including triangular prism crystals, which is a first embodiment of the present invention.

More specifically, the first embodiment of the present invention is a two-layer DOI detector which includes, as shown in FIG. 9, a combination of rectangular prism crystals each divided in two, or triangular prism crystals. Two isosceles right triangular prism crystal elements 51 and 52 are arranged to form a rectangular prism with their hypotenuses opposed to each other. For example, a first upper layer 61 includes the rectangular prisms with the hypotenuses diagonally right up, and a second lower layer 62 includes the rectangular prisms with the hypotenuses diagonally left up. The upper and lower layers are stacked to constitute the two-layer DOI detector. The reflector 55 is interposed between all the crystal elements.

Since each of the crystal elements is a triangular prism extending upward above the light receiving surface, the responses of the crystal elements appear on the 2D position histogram at positions corresponding to the centers of gravity of the triangles at the end faces of the crystals. As shown in FIG. 9, the isosceles right triangular prisms are arranged above a predetermined position of the light receiving surface with the directions of the hypotenuses in the upper and lower layers different from each other. The response positions of the crystals on the light receiving surface are thereby separated from each other, being displaced from each other in the spreading directions of the light receiving surface.

It should be noted that the planar shape of the crystal elements is not limited to an isosceles right triangular shape and may be a scalene right triangular shape.

Figure 10:
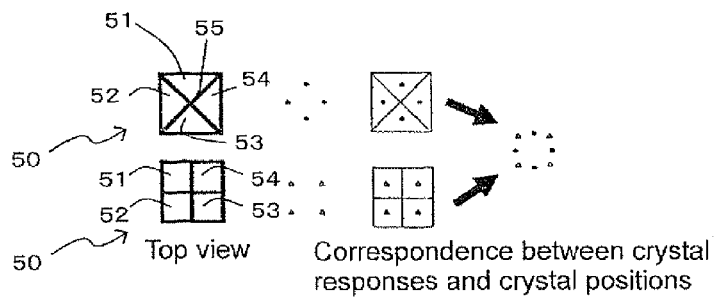
FIG. 10 is a diagram showing two quartering patterns of a rectangular prism crystal and the resulting crystal response positions.

As shown in FIG. 10, the directions in which a rectangular prism crystal 50 is divided into four, 51 to 54, may be changed as shown in the diagram. This allows crystal identification when the two are stacked.

Figure 11:
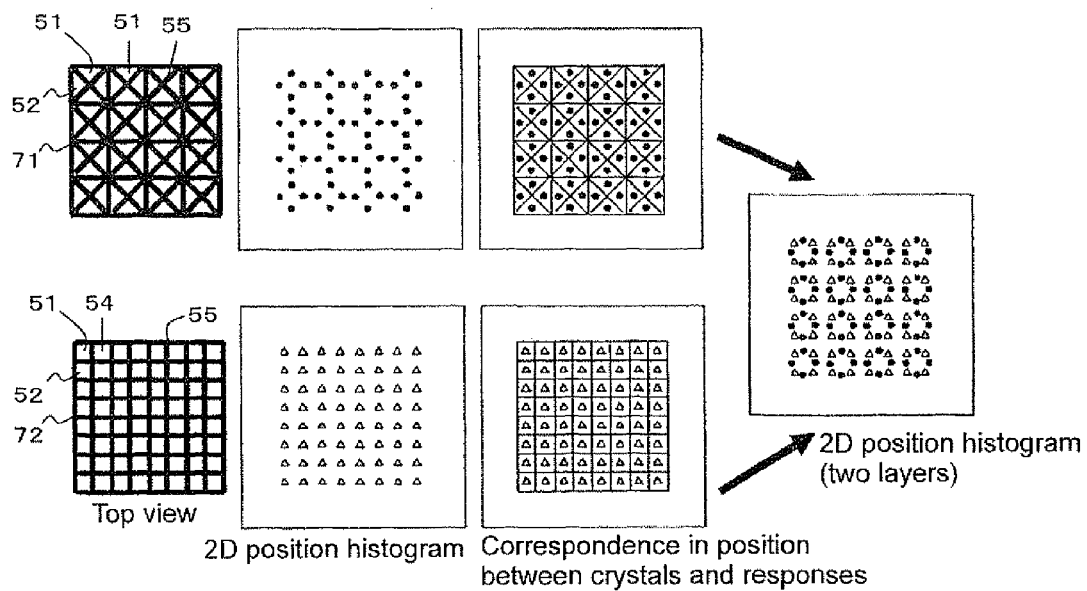
FIG. 11 is a diagram showing a two-layer DOT detector including a combination of triangular prism crystals and rectangular prism crystals, which is a second embodiment of the present invention.

More specifically, as in a second embodiment shown in FIG. 11, a first layer 71 may be composed of rectangular prism blocks that are formed by arranging four right triangular prism scintillation crystals so that the sides forming the respective vertices concentrate each other. A second layer 72 may be composed of rectangular prism blocks that are formed by arranging four rectangular prism scintillation crystals so that either ones of sides forming one of their corners concentrate each other. The two-layer DOI detector is formed so that both types of rectangular prism blocks have the same cross section perpendicular to their prism axis. Since the responses appear at the centers of the crystal shapes, all the crystal responses of the two stacked layers on a single 2D position histogram are staggered in the spreading directions of the light receiving surface without overlapping, which allows crystal identification.

Figure 12:
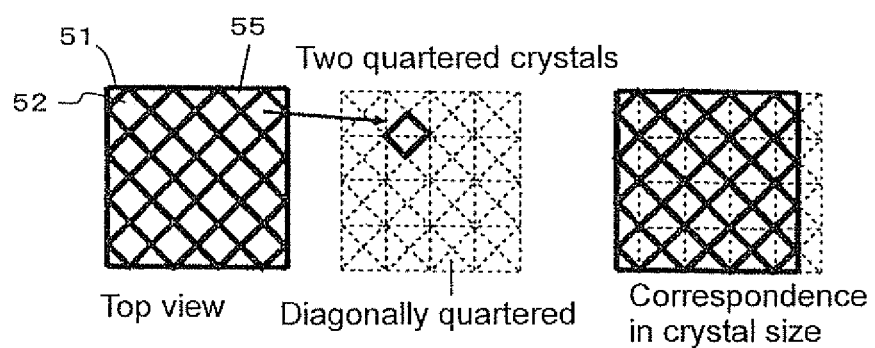
FIG. 12 is a similar diagram showing the arrangement and size of the crystals in the third layer.
Figure 13:
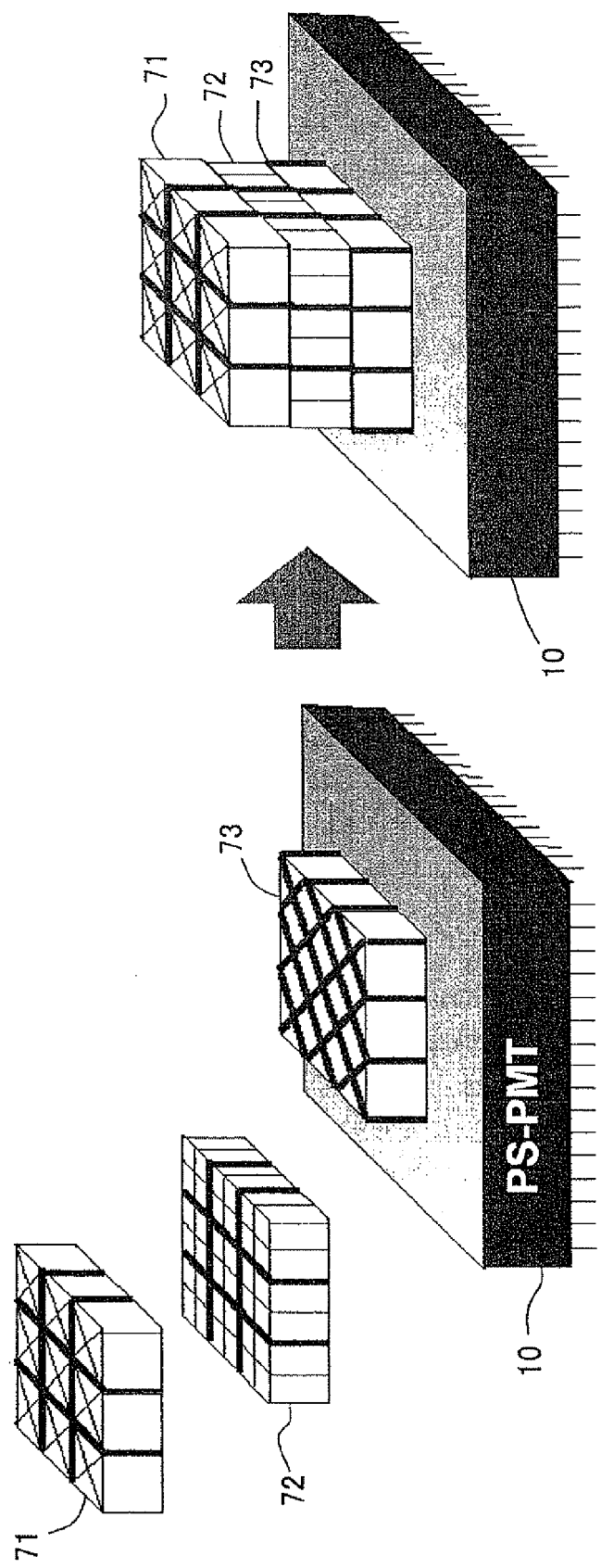
FIG. 13 is a diagram showing a three-layer DOT detector including a combination of triangular prism crystals and rectangular prism crystals, which is a third embodiment of the present invention.
Figure 14:
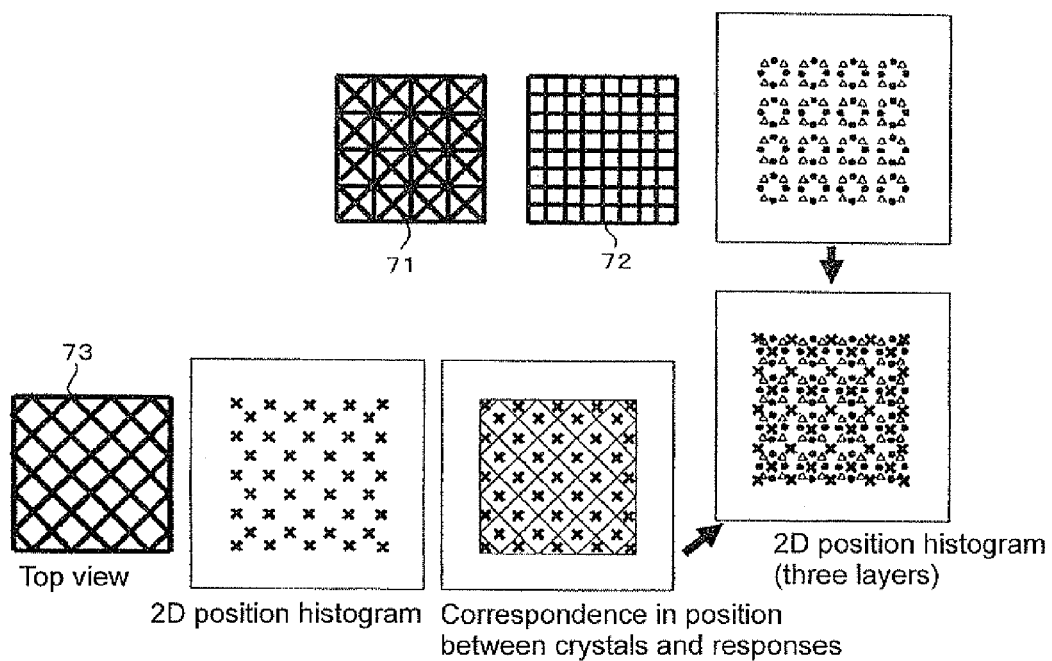
FIG. 14 is an explanatory diagram of a 2D position histogram that is obtained in the third embodiment.

Now, a three-layer DOI detector may be formed, for example, by providing crystals having twice the size in the lowermost layer of the lowest detection efficiency in order to improve its sensitivity. As in a third embodiment shown in FIG. 13, crystals having the shape shown in FIG. 12 can be used to obtain a 2D position histogram on which all the crystals can be identified by only center-of-gravity operations. The crystals in the lowermost layer 73 have a size twice that of a diagonally-quartered crystal as shown in FIG. 12. FIG. 14 shows an explanatory diagram of the resulting 2D position histogram.

Figure 15:
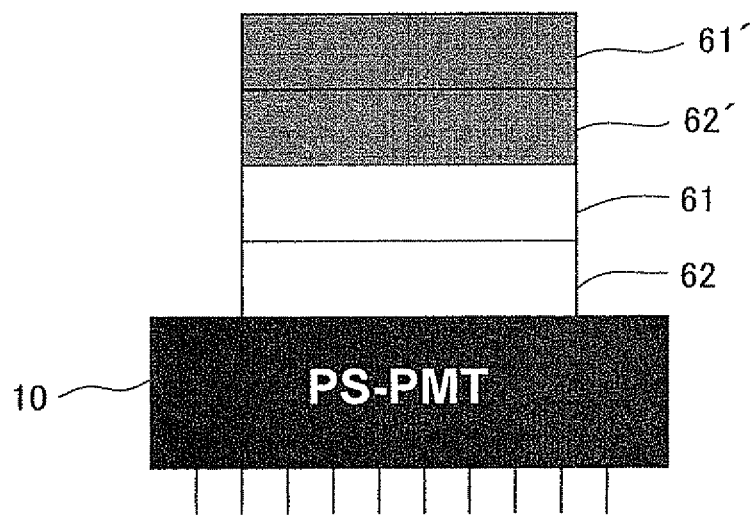
FIG. 15 is a diagram showing a modification.
Figure 16:
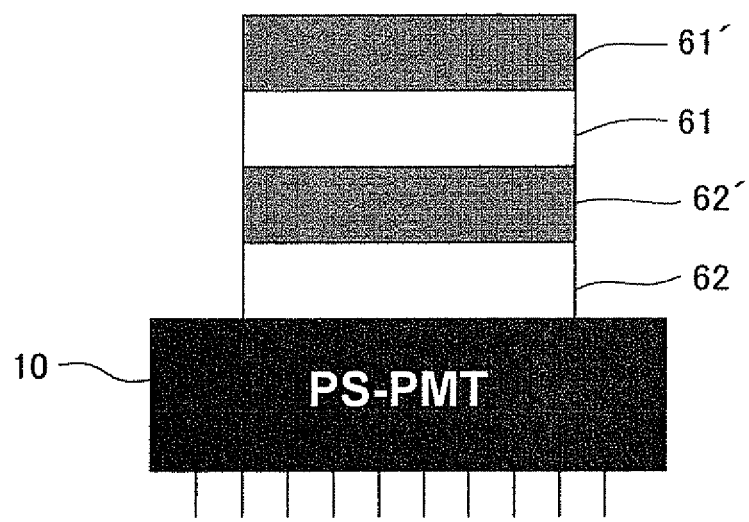
FIG. 16 is a diagram showing another example.

For more layers, the materials of the scintillation crystals may be changed from one layer to another as in a double-layer example shown in FIG. 15. The materials may be alternated as in FIG. 16.

Figure 17:
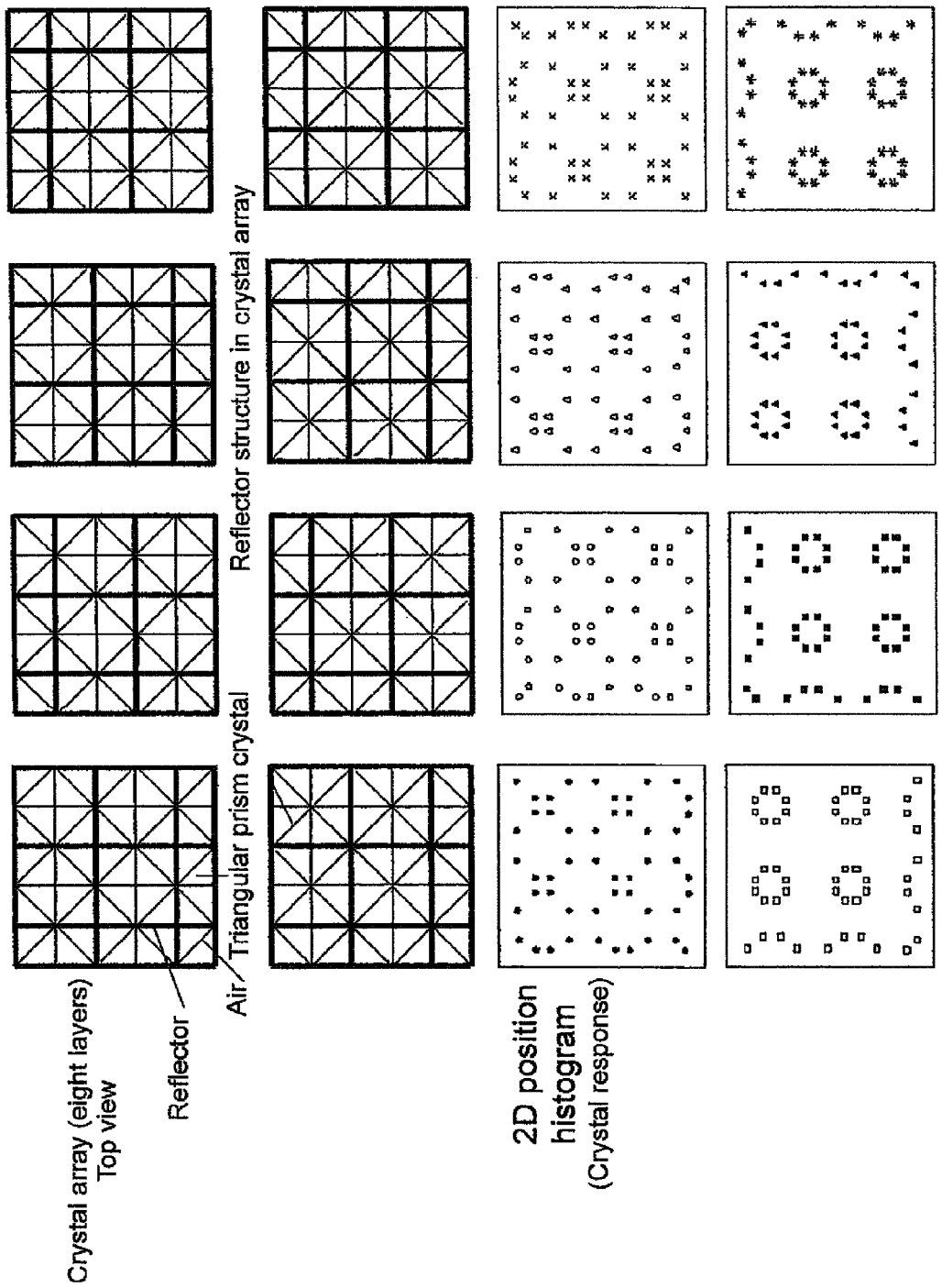
FIG. 17 is a diagram showing an eight-layer DOT detector including triangular prism crystals, which is a fourth embodiment of the present invention.

As in a fourth embodiment shown in FIG. 17, rectangular prism crystals diagonally divided into eight may be combined with the spreading control on the scintillation light according to the background technology (3). This allows DOI identification of eight layers. The eight-layer DOI detector can be formed by using a single kind crystal since no waveform discrimination technique is used.

The principle diagrams are shown in FIGS. 17 to 21. FIG. 17 shows the reflector arrangement in the crystal array in each of the eight stacked scintillation block layers and 2D position histograms corresponding to the respective layers. More specifically, when the right triangular prism crystals are arranged and the reflector 55 is interposed as shown in the diagram, the scintillation light spreads out in the directions of the air layers 56 between the crystals. The result is the 2D position histograms shown in the diagram. Here, the solid circle mark ● represents a crystal response position in the first layer, the open circle mark ○ the second layer, the open triangle mark Δ the third layer, the cross mark X the fourth layer, the open square mark □ the fifth layer, the solid square mark ■ the sixth layer, the solid triangle mark ▲ the seventh layer, and the asterisk mark * the eighth layer.

Figure 18:
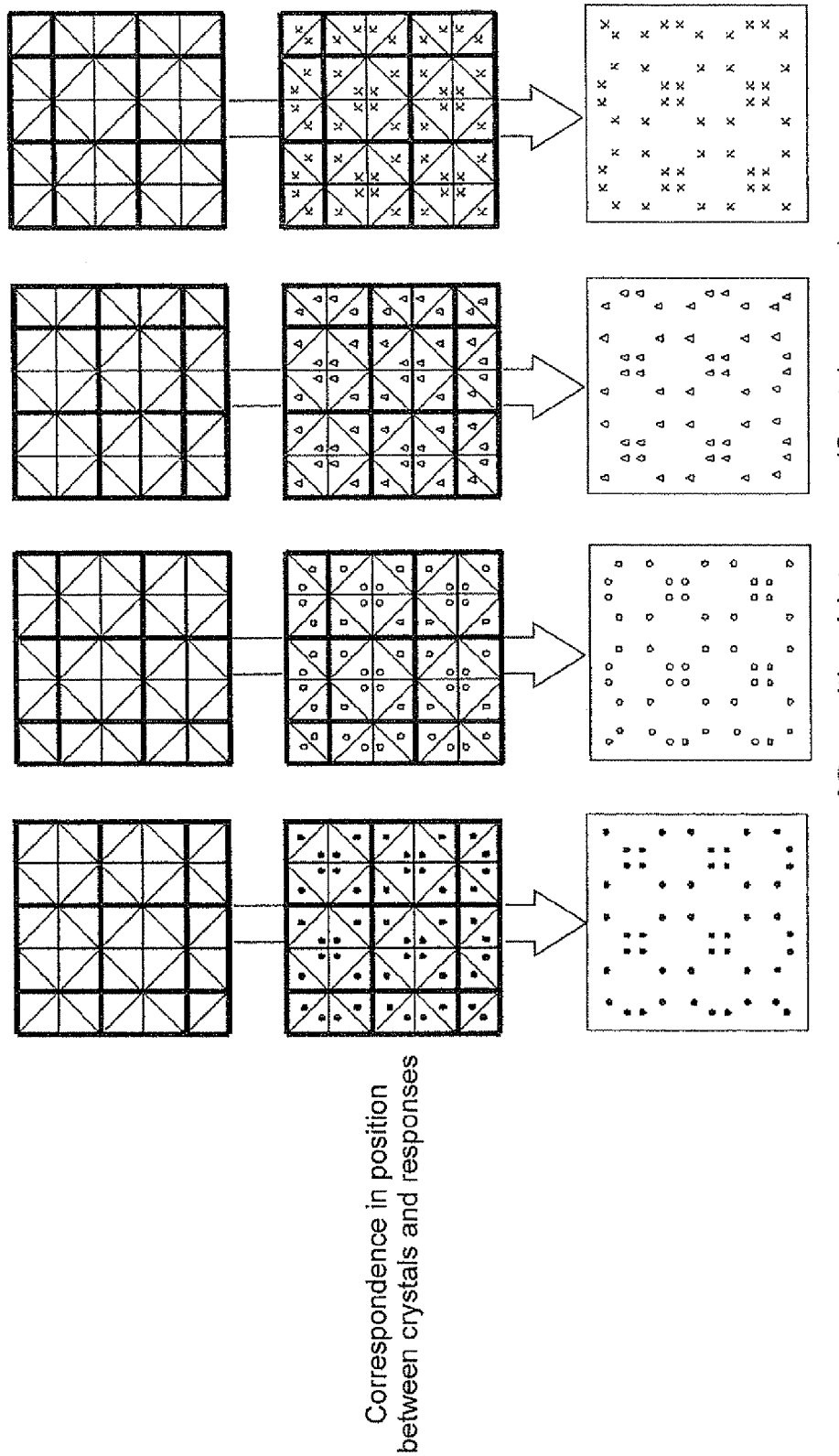
FIG. 18 is a diagram showing part of the crystal array structures and the crystal response positions of the fourth embodiment.

FIG. 18 is a diagram showing the correspondence between crystal array structures and crystal response positions. Two of the right triangular prism scintillation crystals are arranged to form a rectangular prism with their hypotenuses opposed to each other. Four such rectangular prisms are arranged to form a rectangular prism block so that the sides forming one of their corners not including the hypotenuses concentrate each other. The side faces of the rectangular prism block are surrounded by the reflector to form a side shielded rectangular prism block. Such side shielded rectangular prism blocks in predetermined layers above a predetermined position of the light receiving surface overlap each other with a displacement in one of the extending directions of the narrow sides of the right triangular prism scintillation crystals by the length of the narrow sides. The crystal array structures are thereby formed so that the response positions of the crystals can be staggered in the spreading directions of the light receiving surface.

Figure 19:
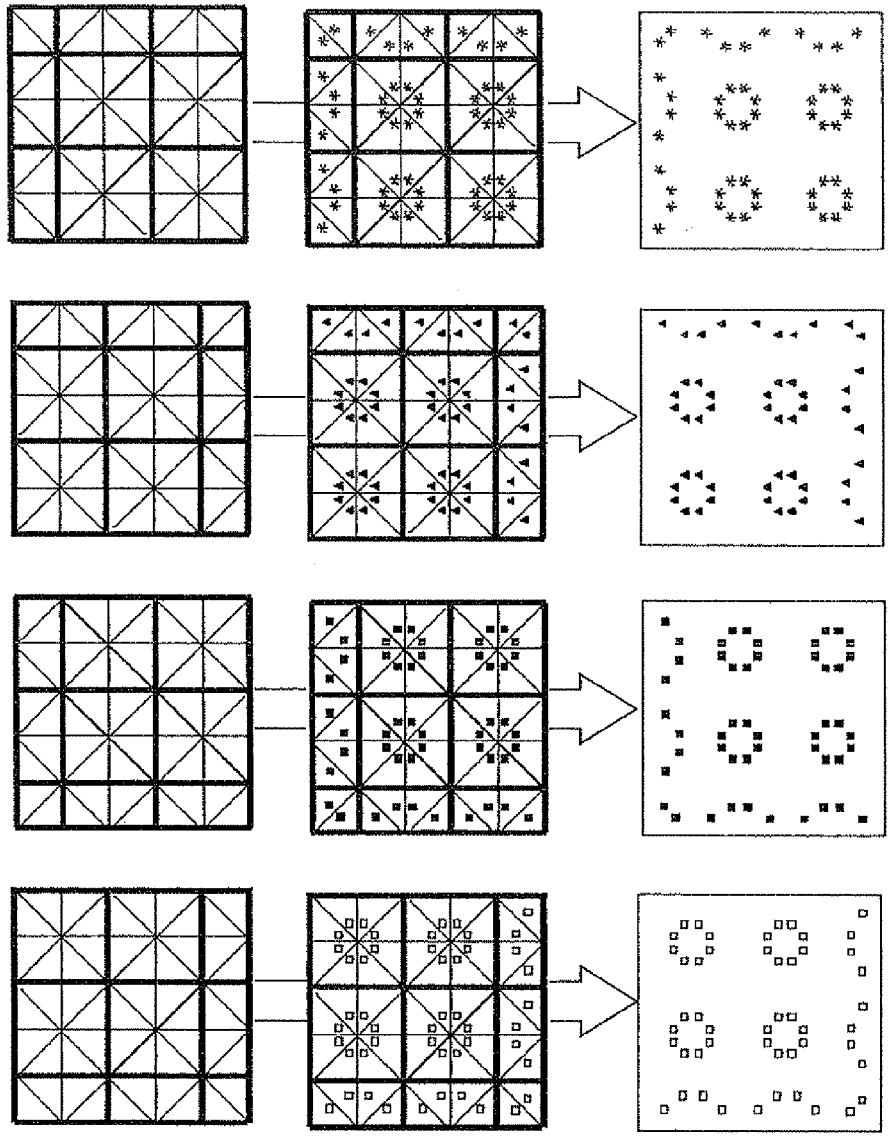
FIG. 19 is a similar diagram showing the rest of the crystal array structures and the crystal response positions of the fourth embodiment.
Figure 20:
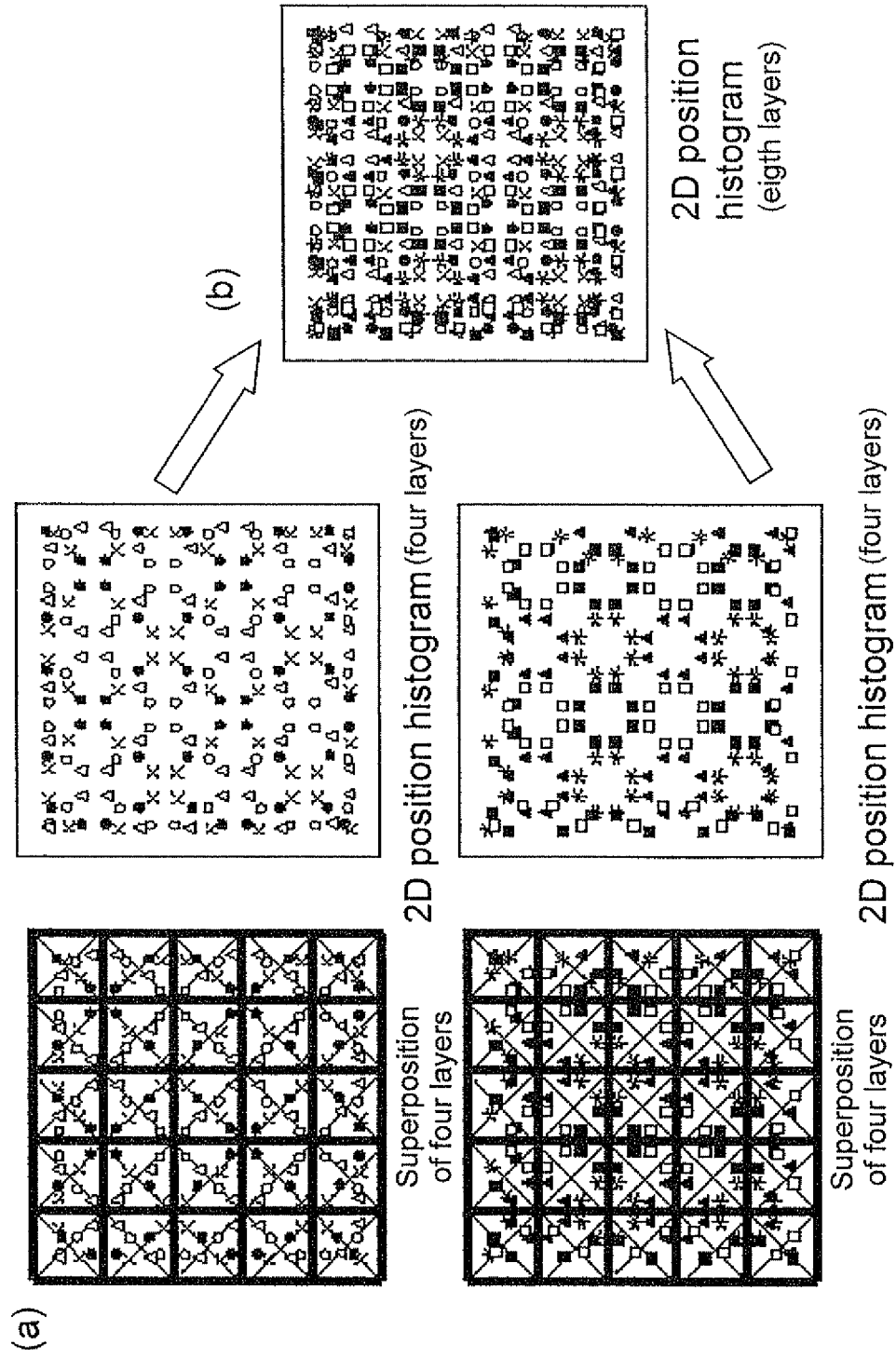
FIG. 20 is a similar diagram showing 2D position histograms for four layers and a 2D position histogram for eight layers.

FIG. 19 is a diagram showing the correspondence between crystal array structures and crystal response positions. Eight of the right triangular prism scintillation crystals are arranged to form a rectangular prism block so that either ones of the sides forming their respective vertices concentrate each other. The side faces of the rectangular prism block are surrounded by the reflector to form a side shielded rectangular prism block. Such side shielded rectangular prism blocks in predetermined layers above a predetermined position of the light receiving surface overlap each other with a displacement in one of the extending directions of the narrow sides of the right triangular prism scintillation crystals by the length of the narrow sides. The crystal array structures are thereby formed so that the response positions of the crystals can be staggered in the spreading directions of the light receiving surface.

FIG. 20(a) shows 2D histograms each showing the response positions when such crystal arrays are stacked in four layers. FIG. 20(b) shows a 2D histogram showing the response positions when the eight layers are stacked. Crystal response positions can overlap at the periphery where the conditions for division and reflector interposition are irregular. In the central area where the proposed conditions are satisfied, the crystal response positions of the eight layers are identifiable without overlapping. By such a method, the crystal response positions up to eight layers can be identified without overlapping.

The crystal array structures shown in FIGS. 18 and 19 can be combined with different scintillation materials to allow stacking of more than eight layers.

It should be noted that the crystal elements of right triangular prism shape according to the present invention may be formed by cutting a scintillation crystal block of cubic or other shape, or may be fabricated by using an ingot of right triangular prism shape. The manufacturing method is not limited in particular.

INDUSTRIAL APPLICABILITY

The DOI type radiation detector according to the present invention may not only be used in a PET device but may be commonly used in nuclear medical imaging devices and radiation measurement devices and so on.

The invention claimed is:

1. A DOI type radiation detector comprising scintillation crystals that are two-dimensionally arranged on a light receiving surface of a light receiving element so as to form groups of rectangular sections in spreading directions of the light receiving surface, the scintillation crystals being stacked into a three-dimensional array so that a response of a radiation-detecting crystal is identifiable by a response position on the light receiving surface, whereby a radiation detection position is determined in three dimensions, wherein
the scintillation crystals are formed as right triangular prisms extending upward above the light receiving surface so as to characterize the response position on the light receiving surface.

2. The DOI type radiation detector according to claim 1, wherein a combination of the scintillation crystals in predetermined two layers above a predetermined position of the light receiving surface is such that a first layer includes right triangular prisms extending upward above the light receiving surface and a second layer includes rectangular prisms extending upward above the light receiving surface so that response positions of the two crystals on the light receiving surface are staggered in the spreading directions of the light receiving surface.

3. The DOI type radiation detector according to claim 1, wherein a combination of the scintillation crystals in predetermined two layers above a predetermined position of the light receiving surface is such that first and second layers both include right triangular prisms extending upward above the light receiving surface with different orientations so that response positions of the two crystals on the light receiving surface are staggered in the spreading directions of the light receiving surface.

4. The DOI type radiation detector according to claim 1, wherein the scintillation crystals in predetermined two layers above the predetermined position of the light receiving surface are made of respective different materials so that the response positions of the two crystals on the light receiving surface are staggered in the spreading directions of the light receiving surface.

5. The DOI type radiation detector according to claim 1, wherein two of the right triangular prisms are arranged to form a rectangular prism with their hypotenuses opposed to each other, thereby forming the rectangular section.

6. The DOI type radiation detector according to claim 1, wherein: a combination of the scintillation crystals in predetermined two layers above a predetermined position of the light receiving surface includes
a rectangular prism block that is formed by arranging four right triangular prism scintillation crystals so that sides forming their respective vertices concentrate each other, and
a rectangular prism block that is formed by arranging four rectangular prism scintillation crystals so that either ones of sides forming one of their corners concentrate each other and so that the two rectangular prism blocks have the same cross section perpendicular to their prism axis; and
the rectangular prism blocks each form the rectangular section.

7. The DOI type radiation detector according to claim 1, wherein the crystals have a size twice that of a diagonally-quartered crystal.

8. The DOI type radiation detector according to claim 7, wherein the crystals having the size twice that of the diagonally-quartered crystal are used in a lowermost layer.

9. The DOI type radiation detector according to claim 1, wherein: eight of the right triangular prism scintillation crystals are arranged to form a rectangular prism block so that either ones of sides forming their vertices concentrate each other;
side faces of the rectangular prism block are surrounded by a reflector to form a side shielded rectangular prism block; and
the side shielded rectangular prism blocks in predetermined layers above a predetermined position of the light receiving surface overlap each other with a displacement in one of extending directions of narrow sides of the right triangular prism scintillation crystals by the length of the narrow sides, whereby the response positions of the two crystals are staggered in the spreading directions of the light receiving surface.

10. The DOI type radiation detector according to claim 9, wherein with four layers, the extending direction is changed from one layer to another.

11. The DOI type radiation detector according to claim 1, wherein: two of the right triangular prism scintillation crystals are arranged to form a rectangular prism with their hypotenuses opposed to each other;
four of the rectangular prisms are arranged to form a rectangular prism block so that any ones of their sides forming an angle not including the hypotenuse concentrate each other;
side faces of the rectangular prism block are surrounded by a reflector to form a side shielded rectangular prism block; and
the side shielded rectangular prism blocks in predetermined layers above a predetermined position of the light receiving surface overlap each other with a displacement in one of extending directions of narrow sides of the right triangular prism scintillation crystals by the length of the narrow sides, whereby the response positions of the two crystals are staggered in the spreading directions of the light receiving surface.

12. The DOI type radiation detector according to claim 11, wherein with four layers, the extending direction is changed from one layer to another.

13. A DOI type radiation detector having a combination of:
the DOI type radiation detectors according to claim 9, optionally with four layers in which the extending direction is changed from one layer to another, and
DOI type radiation detectors comprising scintillation crystals that are two-dimensionally arranged on a light receiving surface of a light receiving element so as to form groups of rectangular sections in spreading directions of the light receiving surface, the scintillation crystals being stacked into a three-dimensional array so that a response of a radiation-detecting crystal is identifiable by a response position on the light receiving surface, whereby a radiation detection position is determined in three dimensions, wherein
the scintillation crystals are formed as right triangular prisms extending upward above the light receiving surface so as to characterize the response position on the light receiving surface, two of the right triangular prism scintillation crystals are arranged to form a rectangular prism with their hypotenuses opposed to each other;
four of the rectangular prisms are arranged to form a rectangular prism block so that any ones of their sides forming an angle not including the hypotenuse concentrate each other;
side faces of the rectangular prism block are surrounded by a reflector to form a side shielded rectangular prism block; and
the side shielded rectangular prism blocks in predetermined layers above a predetermined position of the light receiving surface overlap each other with a displacement in one of extending directions of narrow sides of the right triangular prism scintillation crystals by the length of the narrow sides, whereby the response positions of the two crystals are staggered in the spreading directions of the light receiving surface, optionally with four layers in which the extending direction is changed from one layer to another;
so that the response positions of the crystals up to eight layers above a predetermined position of the light emitting surface are staggered in the spreading directions of the light receiving surface.

14. A DOI type radiation detector having the DOI type radiation detector according to claim 1 that is made of different materials and stacked to form a structure with more layers.

15. The DOI type radiation detector according to claim 1, wherein the right triangular prism is an isosceles right triangular prism.

* * * * *